United States Patent Office 3,816,441
Patented June 11, 1974

3,816,441
DIARYL PERTHIOCYANATES
Raymond Seltzer, New City, N.Y., assignor to
M&T Chemicals Inc., Greenwich, Conn.
No Drawing. Continuation-in-part of application Ser. No. 64,116, July 30, 1970, which is a continuation of application Ser. No. 727,068, May 6, 1968, both now abandoned. This application Jan. 24, 1972, Ser. No. 220,383
Int. Cl. C07d 91/60
U.S. Cl. 260—302 SD 2 Claims

ABSTRACT OF THE DISCLOSURE

Novel heterocyclic compounds of the general formula:

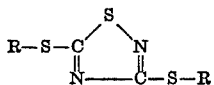

in which R is an aryl or alkaryl hydrocarbon radical containing at least one activating substituent, are prepared by reacting a stable metal salt of perthiocyanic acid with a monofunctional compound $$RX$$

in which X is a replaceable functional group, and recovering said heterocyclic compound and the novel compounds produced by the method.

---

This application is a continuation-in-part of U.S. patent application Ser. No. 64,116, filed July 30, 1970, and now abandoned which was in turn a streamlined continuation of U.S. application Ser. No. 727,068 filed May 6, 1968, and now abandoned.

This invention relates to new and valuable derivatives of 3,5-dimercapto-1,2,4-thiadiazole.

It is known that 1,2,4-thiadiazoles, in which both carbon atoms of the ring exhibit alkyl or aralkyl radicals linked through sulfur atoms, may be prepared by reacting a suitable alkylating agent with a salt of perthiocyanic acid. Attempts to prepare diaryl perthiocyanates by the conventional synthesis route, however, have not been successful.

It is an object of this invention to provide a new class of compounds of 3,5-dimercapto-1,2,4-thiadiazole.

The diaryl perthiocyanates of this invention can be represented by the general formula

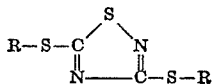

wherein R is selected from the group consisting of activated aryl and activated alkaryl hydrocarbon radicals.

The compounds of this invention can be prepared by reacting a stable metal salt of perthiocyanic acid with a monofunctional compound of the formula $$RX$$

and recovering the diaryl perthiocyanate. R is selected from the group consisting of activated aryl and activated alkaryl radicals. Activated radicals are those wherein the aromatic ring contains substituents which facilitate cleavage of the replaceable group X in the reaction with the thiadiazole. Typical activated aryl or alkaryl radicals contain at least one activating substituent such as —NO$_2$, —CN, —CF$_3$, and —SO$_2$R′ in which R′ may be an alkyl radical. Particularly effective aryl or alkaryl compounds are those bearing the activating substituents in the ortho or para positions of the aromatic ring with respect to the replaceable group X. This type of activated aromatic compound may be represented by the formula:

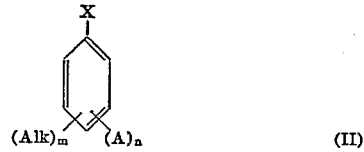

wherein (A) represents substituents such as —NO$_2$, —CN, —CF$_3$, and —SO$_2$R′, at least one of which occupy the ortho or para positions in the ring, $n$ is an integer 1–5, (Alk) is an alkyl radical, and $m$ is zero or an integer not greater than the available positions in the ring. If more than one (A) substituent is present, these may be identical or different.

The radical X is a replaceable functional group, preferably a halide (e.g. fluoride, chloride, bromide, or iodide). Typical specific compounds RX which can be employed may include:

1-chloro-2,4-dinitrobenzene
1-chloro-2,4-dicyanobenzene
1-chloro-2,4-di(trifluoromethyl)benzene
1-chloro-2,4-di(ethylsulfonyl)benzene
1-bromo-2-methyl-4-nitro benzene
4-nitro phenyl chloride
4-cyano phenyl chloride.

Stable metal salts of perthiocyanic acid used in preparing the compounds of this invention include salts of copper, aluminum, iron, magnesium, sodium, potassium, and the like. Preferably, the alkali metal salts of perthiocyanic acid are employed. These may be prepared conveniently by reacting isoperthiocyanic acid (which can, in turn, be readily prepared by reacting ammonium thiocyanate with hydrochloric acid) with an alkali metal hydroxide or alkoxide in alcohol or alcohol-water medium. In a specific example where sodium ethoxide is used, the reaction which occurs may be described by the following equation:

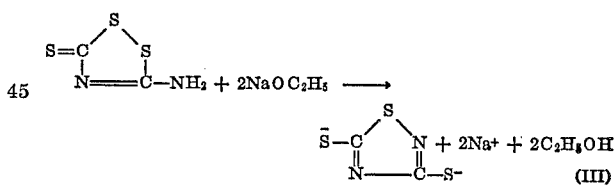

Preferably the molar ratio of isoperthiocyanic acid to the alkali metal compound is 1:2. For the synthesis of disubstituted perthiocyanic acid derivatives in accordance with the process of this invention, it may be advantageous to prepare the alkali metal salt of perthiocyanic acid *in situ* just prior to the reaction with the monofunctional aromatic compound RX.

The reaction between the stable metal salt of perthiocyanic acid and the monofunctional aromatic compound is conveniently conducted in an organic solvent reaction medium capable of at least partially dissolving the reactants. Typical solvents which may be used include alkanols such as methanol and ethanol; ketones such as acetone or methyl ethyl ketone; and ethers such as dioxane and tetrahydrofuran. The amount of reaction medium used is preferably sufficient to maintain the reaction mixture in a liquid state.

The process may be carried out at ambient temperature. Generally, there is no advantage to carrying out the reaction at a temperature much below 0° C. or above about 100° C. A suitable temperature range is 15° C. to 30° C.

The molar ratio of the metal perthiocyanate to the monofunctional aromatic compound is preferably about 1:2. In some instances the yield may be increased by using an excess of the monofunctional aromatic compound.

An example is described hereinbelow to illustrate the preparation of a typical compound of this invention. It is understood that the procedure described in the example is equally suitable for preparing other diaryl perthiocyanates containing —CN, —CF$_3$, and —SO$_2$R' groups on the benzene ring.

EXAMPLE

Bis(2,4-dinitrobenzene-1)-perthiocyanate

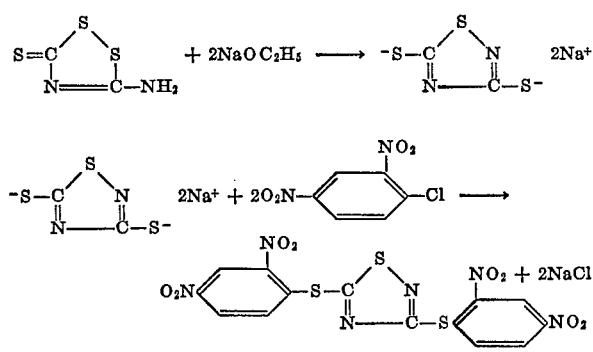

25.0 grams (0.167 mole) of isoperthiocyanic acid was added to 300 milliliters of absolute ethanol which had previously been reacted with 7.66 grams (0.33 mole) of metallic sodium. The mixture was stirred until the acid was completely dissolved. The solution was filtered to remove isoluble material, and a solution of 1-chloro-2,4-dinitrobenzene in tetrahydrofuran was added dropwise to the resultant filtrate while maintaining the temperature of the mixture at 38° C. An orange solid precipitated out from the solution during the addition. The mixture of solid and liquid phases was allowed to stand at room temperature overnight and then filtered. The solid residue was washed free of chloride ion with water and dried to yield 73.5 grams (91%) of product, melting point 137°–160° C. A sample was obtained by recrystallization from toluene exhibited a melting point 158°–160° C. and the following elemental analysis.

Calculated for C$_{14}$H$_6$N$_6$O$_8$S$_3$: C, 34.9; H, 1.2; N, 17.4; S, 20.0. Found: C, 35.0; H, 1.3; N, 17.0; S, 19.7.

The compounds of this invention are useful for stabilizing ethers and other organic compounds which have a tendency to form peroxides upon exposure to air for prolonged periods of time. A concentration of between about 0.1 and 10% by weight of the present compounds is considered suitable for this purpose.

As many embodiments of this invention may be made without departing from the spirit and scope thereof, it is to be understood that the invention includes all such modifications as come within the scope of the appended claims.

What is claimed is:

1. A heterocyclic compound of the formula $$\begin{array}{c} S \\ R-S-C{\diagup}{\diagdown}N \\ \parallel \quad \parallel \\ N{-\!\!\!-\!\!\!-}C-S-R \end{array}$$

wherein R is a radical of the general formula $$(CH_3)_m{-}\!\!\bigcirc\!\!{-}A_n$$

wherein each A is individually selected from monovalent radicals of the formulae —NO$_2$, —CN, —CF$_3$, and —SO$_2$R' wherein R' represents an ethyl radical with the proviso that at least one A occupies a position which is ortho or para with respect to the free valence on the benzene ring; $n$ is the integer 1 or 2 and $m$ is the integer 0 or 1.

2. A heterocyclic compound, as claimed in claim 1, of the formula $$\begin{array}{c} NO_2 \qquad\qquad S \\ NO_2{-}\!\!\bigcirc\!\!{-}S-C{\diagup}{\diagdown}N\quad NO_2 \\ \parallel \quad \parallel \\ N{-\!\!\!-\!\!\!-}C-S{-}\!\!\bigcirc\!\!{-}NO_2 \end{array}$$

References Cited
UNITED STATES PATENTS 3,597,426  8/1971  Seltzer _____ 260—302 SD RICHARD J. GALLAGHER, Primary Examiner U.S. Cl. X.R.

252—402